(12) United States Patent
Miller et al.

(10) Patent No.: US 7,448,466 B2
(45) Date of Patent: Nov. 11, 2008

(54) SENSOR MOUNTING FOR POWER ASSISTED STEERING SYSTEM

(75) Inventors: Joseph D. Miller, Farmington Hills, MI (US); Richard A. Stoll, Royal Oak, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 427 days.

(21) Appl. No.: 11/210,994

(22) Filed: Aug. 24, 2005

(65) Prior Publication Data

US 2007/0051555 A1    Mar. 8, 2007

(51) Int. Cl.
B62D 5/04    (2006.01)

(52) U.S. Cl. ....................................... 180/444

(58) Field of Classification Search ................. 180/443, 180/444
See application file for complete search history.

(56) References Cited

U.S. PATENT DOCUMENTS

| | | | |
|---|---|---|---|
| 4,681,182 A | 7/1987 | Suzuki et al. | |
| 4,741,408 A | 5/1988 | Bausch et al. | |
| 4,753,310 A | 6/1988 | Hashimoto | |
| 4,782,907 A | 11/1988 | Morishita et al. | |
| 4,842,087 A | 6/1989 | Morishita et al. | |
| 4,874,053 A | 10/1989 | Kimura et al. | |
| 5,230,397 A | 7/1993 | Tranchon | |
| 5,732,791 A | 3/1998 | Pinkos et al. | |
| 5,770,902 A | 6/1998 | Batten et al. | |
| 5,785,145 A * | 7/1998 | Wakao et al. | 180/443 |
| 5,825,178 A | 10/1998 | Hipp et al. | |
| 6,211,631 B1 * | 4/2001 | Wilson-Jones et al. | 318/12 |
| 6,354,396 B1 | 3/2002 | Horton et al. | |
| 6,470,993 B1 | 10/2002 | Matsuda et al. | |
| 6,505,702 B1 | 1/2003 | Shinmura et al. | |
| 6,679,350 B2 | 1/2004 | Shimizu et al. | |
| 7,021,418 B2 * | 4/2006 | Tominaga et al. | 180/444 |
| 2002/0060105 A1 | 5/2002 | Tominaga et al. | |
| 2005/0150712 A1 | 7/2005 | Tokumoto | |
| 2007/0175697 A1 * | 8/2007 | Choi | 180/444 |

FOREIGN PATENT DOCUMENTS

FR        77 34671        8/1979

* cited by examiner

*Primary Examiner*—Tony H. Winner
(74) *Attorney, Agent, or Firm*—MacMillan, Sobanski & Todd, LLC

(57) ABSTRACT

A power assisted steering system includes a steering assembly and a power assist assembly. The power assist assembly includes a motor having an output shaft that is connected to the steering assembly. A target disc is connected to the output shaft for rotation therewith. A control unit has a printed circuit board including at least one sensor supported thereon. The sensor is responsive to rotation of the target disc for generating a signal. The controller is responsive to the sensor signal for controlling the operation of the motor.

17 Claims, 4 Drawing Sheets

SENSOR MOUNTING FOR POWER ASSISTED STEERING SYSTEM

BACKGROUND OF THE INVENTION

This invention relates in general to power assisted steering systems, such as are commonly used in vehicles. In particular, this invention relates to an improved mounting of a sensor within the power assist assembly for such a power assisted steering system.

Many vehicles in common use, such as automobiles, vans, and trucks, include a power assisted steering system for allowing a driver to pivot a pair of ground-engaging vehicle wheels about respective turning axes and, thus, control the direction of movement of the vehicle. A typical power assisted steering system includes a steering assembly and a power assist assembly. The steering assembly includes a steering wheel that is manually rotated by the driver to pivot the vehicle wheels about their respective turning axes. The power assist assembly is responsive to the amount of torque that is exerted by the driver to rotate the steering wheel for generating a force that assists in pivoting the vehicle wheels, thereby reducing the amount of torque that the driver would otherwise have to manually apply to the steering wheel.

The steering assembly commonly includes a rack and pinion mechanism that includes a steering shaft connected to the steering wheel for rotation therewith. The steering shaft has a helical pinion gear provided thereon that cooperates with a corresponding plurality of gear teeth provided on a transversely extending rack. The opposed ends of the rack are connected to the vehicle wheels such that linear movement of the rack causes pivoting movement of the vehicle wheels. When the steering wheel is rotated by the driver, the helical pinion gear provided on the steering shaft rotates relative to the rack. The cooperation of the helical pinion gear with the plurality of gear teeth provided on the rack causes the rack to move linearly relative to the steering shaft, resulting in pivoting movement of the vehicle wheels.

The power assist assembly typically includes a sensor that generates a signal that is representative of the amount of torque that is exerted by the driver to rotate the steering wheel and a hydraulic or electric actuator that is responsive to the sensor signal for selectively rotating an output shaft. In a column driven power assist assembly, the output shaft is connected through a gearing mechanism to the steering shaft. When the output shaft is rotated in response to the sensor signal, the gearing mechanism exerts a force on the steering shaft that assists in pivoting the vehicle wheels. To assist in more precisely controlling the operation of the motor, the power assist assembly further includes a sensor for detecting the speed and/or direction of the output shaft of motor.

BRIEF SUMMARY OF THE INVENTION

This invention relates to a mounting of a sensor on a power assist assembly of a power assisted steering system. The power assisted steering system generally includes a steering assembly and the power assist assembly. The power assist assembly includes a motor having an output shaft that is connected to the steering assembly. A target disc is connected to the output shaft for rotation therewith. A control unit has a printed circuit board. The sensor is supported on the printed circuit board. The sensor is responsive to rotation of the target disc for generating a signal. The controller is responsive to the sensor signal for controlling the operation of the motor.

Various objects and advantages of this invention will become apparent to those skilled in the art from the following detailed description of the preferred embodiment, when read in light of the accompanying drawings.

DETAILED DESCRIPTION OF THE INVENTION

Figure 1:
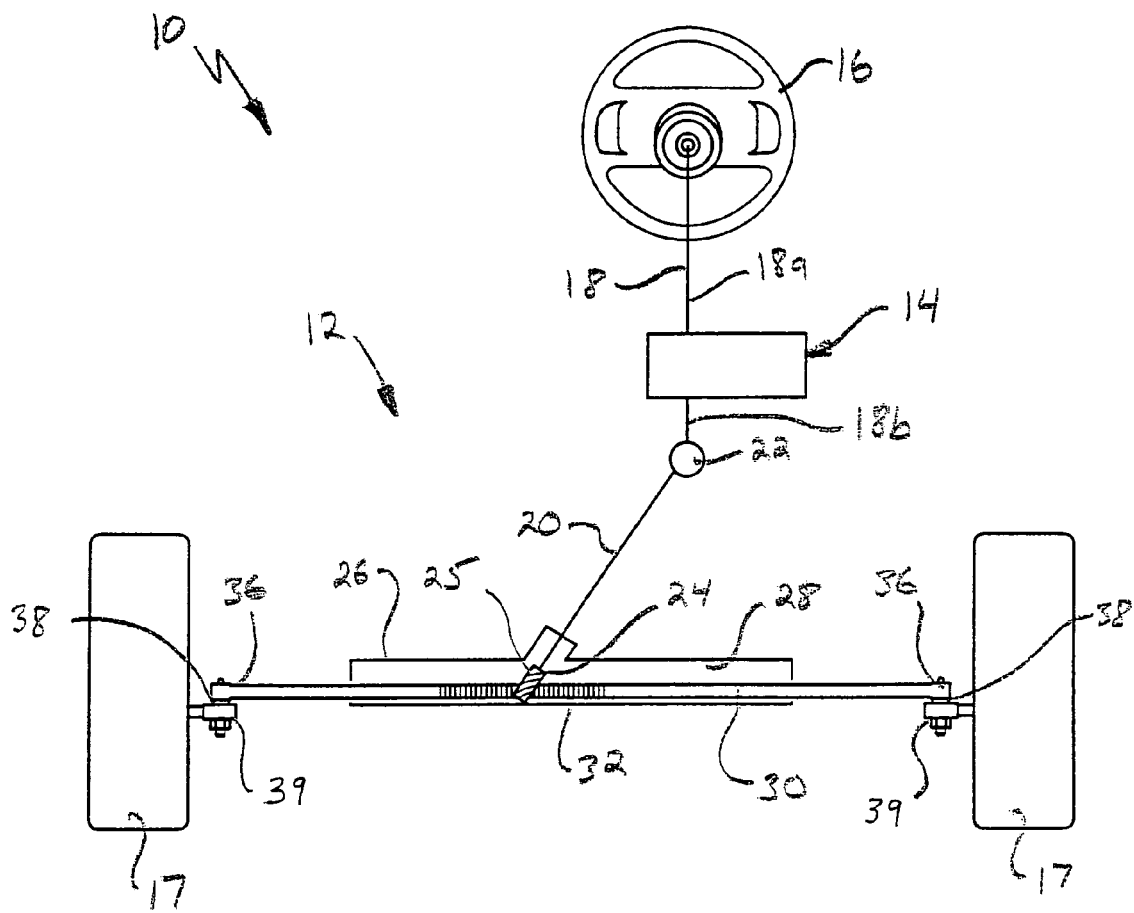
FIG. 1 is a schematic view of a steering system including a power assist assembly in accordance with the present invention.

Referring now to the drawings, there is illustrated in FIG. 1 a power assisted steering system, indicated generally at 10. The system 10 generally includes a steering assembly 12 and a power assist assembly 14. The steering assembly 12 includes a steering wheel 16. The steering wheel 16 is manually rotated by the driver of the vehicle in which the steering system 10 is installed to pivot wheels 17 about their respective turning axes when the driver wishes to turn the vehicle. The steering wheel 16 is rotatably connected to an input shaft 18. The input shaft 18 is connected to the power assist assembly 14. The input shaft 18 is rotatably connected to an intermediate shaft 20. The input shaft 14 may be rotatably connected to the intermediate shaft 20 by a universal joint 22. The universal joint 22 permits a rotational connection between the input shaft 18 and the intermediate shaft 20 while accommodating an angular misalignment between the rotational axes of the input shaft 18 and the intermediate shaft 20. The input shaft 18 may include first and second portions 18a and 18b individually connected to the power assist assembly 14. The first portion 18a is connected to the steering wheel 16 and the power assist assembly 14. The second portion 18b is connected to the power assist assembly 14 and the intermediate shaft 20 via the universal joint 22.

The intermediate shaft 20 connects to a pinion 24 having helical teeth 25 formed therein. The pinion 24 is a separate component connected to the intermediate shaft 20. The input shaft 18, the intermediate shaft 20, and the pinion 24 may be formed from multiple components.

The steering assembly 12 further includes a housing 26 which may be formed of a single piece or from multiple components. The housing 26 includes a bore 28. A rack 30 is slidably disposed in the bore 28 along a longitudinal axis extending along the length of the rack 30. The rack 30 is generally an elongated bar having a longitudinally extending row of rack teeth 32. The teeth 32 of the rack 30 are in meshing engagement with the teeth 25 of the pinion 24. The rack 30 includes ends 36 which extend outward from the housing 26. The ends 36 can be integral with the rack 30 or can be separate components connected to the rack 30. For example, the ends 36 can be elongated members coupled to the rack 30 via a ball socket connection (not shown). The ends 36 are connected to respective tie rods 38 and steering knuckle arms 39 in a conventional manner. The steering knuckle arms 39 are connected to the steered wheels 17 in a conventional manner. The ends 36 of the rack 30 may also be operatively connected with other suspension members, such as wheel axles, shock absorbers, and upper and lower suspension arms, as is conventionally known in the art.

Although the steering assembly 12 is shown and described as a rack and pinion type steering system, it should be understood that the steering assembly 12 can be any suitable vehicle steering assembly which transfers the input movement of the steering wheel 16 to corresponding pivoting motion of the wheels 17. For example, the steering assembly 12 could be configured as a conventionally known recirculating-ball type steering assembly (not shown) which are generally used on larger vehicles. Recirculating-ball type steering assemblies commonly include a steering shaft connected to the steering wheel. The steering shaft has a threaded portion which meshes with a recirculating ball nut mechanism. As the input shaft is turned by the steering wheel, the ball nut moves in a translational direction along the length of the steering shaft. The ball nut includes a threaded portion engaged with a sector gear connected to a pitman arm. Movement of the sector gear by the ball nut rotates the pitman arm which are in turn connected to tie rods, thereby pivoting the wheels about their respective turning axes.

As shown in the embodiment of FIG. 1, the power assist assembly 14 is connected to the input shaft 18 and more specifically, connected to the first and second portions 18a and 18b of the input shaft 18. It should be understood that the power assist assembly can be configured to connect to any suitable component of the steering assembly 12. For example, the power assist assembly 14 can be connected to the intermediate shaft 20 is a similar manner as the input shaft 18. Alternatively, the power assist assembly 14 can be connected with the rack 30, such as with a ball nut mechanism (not shown) to provide an assisting force to move the rack 30 in a translational manner in the housing 26.

Figure 2:
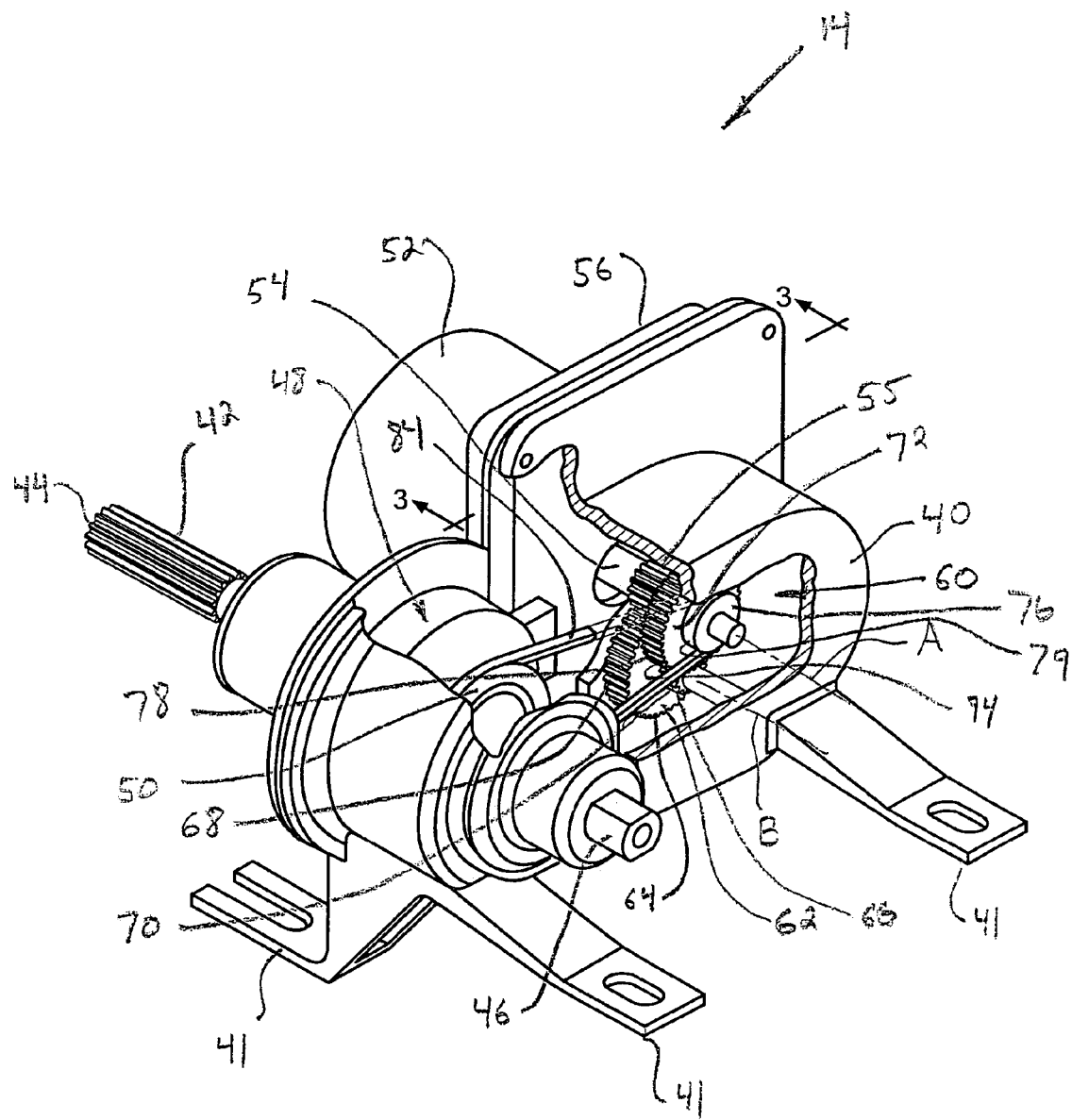
FIG. 2 is a perspective view, shown partially in section, of an embodiment of a power assist assembly in accordance with the present invention.

As shown in FIG. 2, the embodiment of the power assist assembly 14 includes a housing 40 (shown partially broken away in FIG. 2). The housing 40 includes a first portion, as generally shown on the right-hand side as viewing FIG. 2, and a second portion, as generally shown on the left-hand side as viewing FIG. 2. The housing 40 may include mounting structures 41 for attaching the power assist assembly 14 to the vehicle. A steering shaft 42 is rotatably mounted in the housing 40. The steering shaft 42 includes a first end 44 which connects with the first portion 18a of the input shaft 18 such that rotation of the first portion 18a causes rotation of the steering shaft 42. A second end 46 of the steering shaft 42 is connected to the second portion 18b of the input shaft 18 such that rotation of the first portion 18a causes rotation of the steering shaft 42. The ends 44 and 46 can be connected to the portions 18a and 18b, respectively, by any suitable manner, such as by a universal joint or a splined connection.

The power assist assembly 14 further includes a torque sensor, indicated generally at 48. The torque sensor 48 generates a signal that is representative of the amount of torque that is exerted by the driver to rotate steering shaft 42 via the steering wheel 16 and input shaft 18. A pulley 50 is mounted on the steering shaft 42 and is preferably rotationally fixed thereto.

The power assist assembly 14 further includes an electric motor 52 having an output shaft 54. The output shaft 54 includes a plurality of gear teeth 55 formed thereon and rotates about an axis A: The motor 52 is attached to a motor housing 56. The motor housing 56 is attached to the housing 40. A gear assembly, indicated generally at 60, connects the output shaft 54 of the motor 52 to the steering shaft 42. The gear assembly 60 provides rotational connection between the output shaft 54 and the steering shaft 42. The gear assembly 60 also preferably provides for rotational gear reduction such that the rotational speed exerted by the gear assembly 60 on the steering shaft 42 is less than the rotational speed of the output shaft 54 of the motor 52. The gear assembly 60 includes a first gear 62 rotatably mounted on the housing 40 along an axis B. The first gear 62 includes a large diameter portion 64 and a smaller diameter portion 66 coaxially aligned with the large diameter portion 64. The large diameter portion 64 includes a plurality of gear teeth 68 formed thereon. The small diameter portion 66 includes a plurality of gear teeth 70 formed thereon.

The gear assembly 60 also includes a second gear 72 which is mounted on the housing 40 for rotation along the axis A. Note that the second gear 72 is rotatably mounted independently from the output shaft 54 of the motor 52. Although the second gear 72 is shown and described as being coaxially aligned with the output shaft 54 along axis A, the second gear 72 can be rotatably mounted relative to the housing in a non-coaxial manner with respect to the output shaft 54. The second gear 72 includes a large diameter portion 74 and a smaller diameter portion 76 coaxially aligned with the large diameter portion 74. The large diameter portion 74 includes a plurality of gear teeth 78 formed thereon. The small diameter portion 76 defines a pulley 79 for receiving a belt 84.

The gear teeth 55 of the output shaft 54 of the motor 52 are in meshing engagement with the gear teeth 68 of the large diameter portion 64 of the first gear 62. The gear teeth 70 of the small diameter portion 66 of the first gear 62 are in meshing engagement with the gear teeth 78 of the large diameter portion 74 of the second gear 72. The belt 84 rotationally connects the pulley 79 of the second gear 72 to the pulley 50 mounted on the steering shaft 42. Note that the pulley 82 may have a diameter less than the diameter of the pulley 50, thereby further providing a speed reduction between the rotational speed of the motor 52 and the rotational speed of the steering shaft 42.

Note that the embodiment of the gear assembly 60 shown and described herein is of a direct gearing configuration. It should be understood that the gearing assembly 60 can be any suitable mechanism for providing a rotational connection between the output shaft 54 and the steering shaft 42, and also preferably provides for rotational gear reduction. For example, the gear assembly 60 can be a planetary gearing configuration (not shown) in which conventionally known, sun, planetary and ring gears are used.

Figure 3:
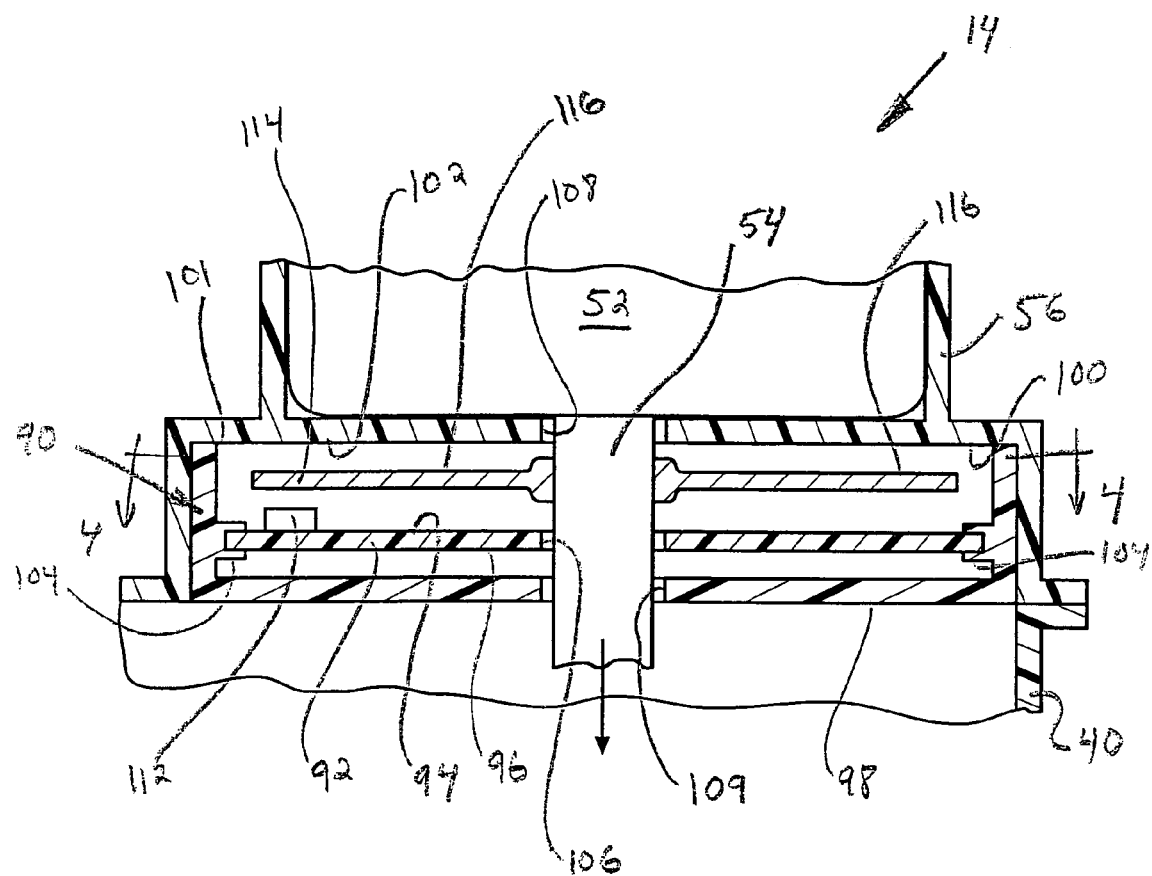
FIG. 3 is a cross-section view taken along lines 3-3 of FIG. 2.
Figure 4:
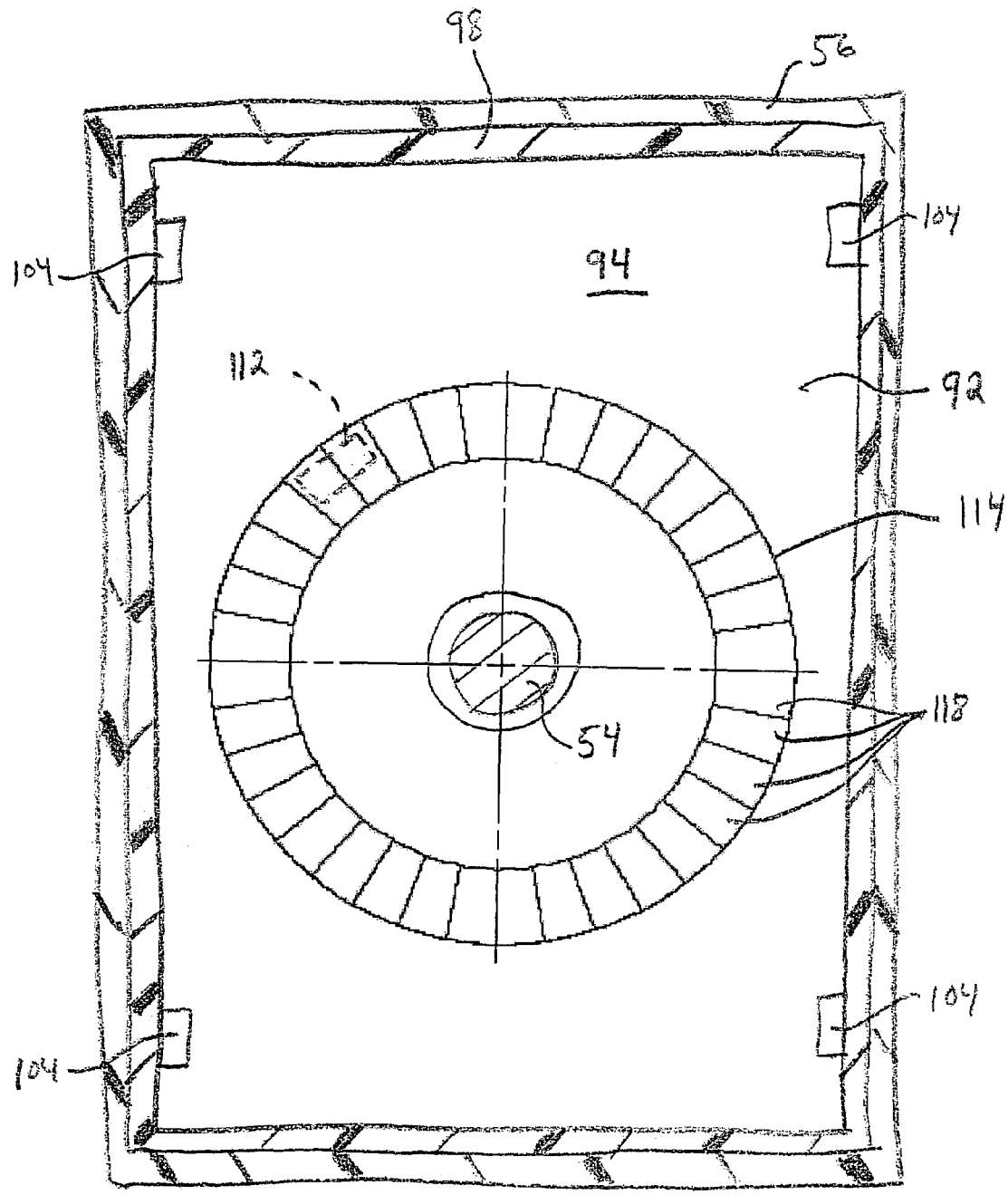
FIG. 4 is a cross-sectional view taken along lines 4-4 in FIG. 3.

As best shown in FIG. 3, the power assist assembly 14 further includes an electronic control unit, indicated generally at 90, preferably mounted therein. The control unit 90 can be any suitable electronic control unit, such as a microprocessor, for controlling the power assist assembly 14. The control unit 90 uses various sensory inputs to control the power assist assembly 14, such as for example, regulating the current in the motor 52 to provide the proper requested assisting force imparted on the steering shaft 42. The torque sensor 48 is connected to the control unit 90. The control unit 90 includes one or more printed circuit boards 92. In the embodiment of the control unit 90 shown in FIG. 1, there is illustrated a single printed circuit board 92 having first and second opposed sides 94 and 96. The circuit board 92 can include any suitable circuitry and electronic components mounted thereon for controlling the power assist assembly 14. The circuitry and electronic components can be mounted on either of the sides 94 and 96, or on both sides 94 and 96. The printed circuit board 92 is mounted in a control housing 98. The control housing 98 is retained in a recess 100 formed in the motor housing 56. The control housing 98 defines an open end 101 which is positioned adjacent a bottom surface 102 of the recess 100 of the motor housing 56. The printed circuit board 92 can be retained in the control housing 98 by any suitable manner, such as by a plurality of clips 104 integrally formed in the control housing 98. The printed circuit board 92 includes a hole 106 formed therethrough to permit the passage of the output shaft. The motor housing 56 includes a hole 108 formed therethrough to permit the passage of the output shaft 54. Likewise, the control housing 98 includes a holes 109 formed therethrough to permit the passage of the output shaft 54.

It should be understood that the housing 40, the motor housing 56, and the control housing 98 can have any suitable shape for housing the components of the power assist assembly 14 and may be formed separately or in combination and can have multiple number of parts.

A sensor 112 is supported on the printed circuit board 92, and is electrically connected with the control unit 90. Preferably the sensor 112 is directly mounted on the side 94 of the printed circuit board 92. Since the sensor 112 is supported on the printed circuit board 92, the sensor 112 can be easily electrically connected to the circuitry of the printed circuit board 92 without the need of a separate leadframe. The sensor 112 can be directly connected to the printed circuit board, such as by soldering or by any other suitable method.

The control unit 90 further includes a target disc 114 mounted on the output shaft 54. Preferably, the target disc 114 is co-axially supported on and directly connected to the output shaft 54. The target disc 114 may be press fit onto the output shaft 54. The sensor 112 is responsive to the rotation of the target disc 114 and generates a target disc signal based on the detection of the rotational movement of the target disc 114. Preferably, the sensor 112 and the corresponding target disc 114 are configured such that the sensor 112 can detect the speed of the target disc 114 and the rotational direction of the target disc 114. Since the target disc 114 is attached to the output shaft 54, the target disc signal corresponds to the speed and rotational direction of the motor 52 and its output shaft 54. Furthermore, the sensor 112 and the corresponding target disc 114 may be configured such that the sensor 112 can detect the angular position of the target disc 114.

The sensor 112 and the target disc 114 can by any suitable device or devices for generating a signal responsive to the rotation of the output shaft 54. For example, the sensor 112 can be a non-contact limit switch. More preferably, the sensor 112 is a Hall effect sensor. Correspondingly, the target disc 114 may include a magnetic gradient formed on a surface 116 defined by a plurality of alternating north and south magnetically charged elements 118 circumferentially spaced about the circumference of the target disc 118. The elements 118 can be any suitable component or material capable of retaining a magnetic charge. The elements 118 can be formed and/or mounted on the surface 116 or can be disposed internally in the target disc 114 to protect the elements 118 from the environment within the control housing 98.

The operation of the steering system 10 will now be described. When a steering maneuver is desired, the driver rotates the steering wheel 16 in the desired rotational direction. Rotation of the steering wheel 16 causes rotation of the input shaft 18, the intermediate shaft 20, and the pinion 24. The meshing engagement between the teeth 25 of the pinion 24 and the teeth 32 of the rack 30 causes the rack 30 to move longitudinally within the bore 28 of the housing 26. Longitudinal movement of the rack 30 causes movement of the tie rods 38 and the steering knuckle arms 39 which pivot the vehicle wheels 17 relative to the vehicle based on the direction of the longitudinal movement of the rack 30.

To provide an assisting force on the input shaft 18, the power assist assembly 14 is actuated. The torque sensor 48 detects the driver's input and the control unit regulates the speed of the electric motor 52 accordingly. The control unit 90 may be connected to other sensors, such as vehicle speed sensors (not shown) for determining the appropriate current for the motor 52. Actuation of the motor 52 rotates the output shaft 54. The rotation and meshing of the output shaft 54 and the gears 62 and 72 causes rotation of the pulley 79 and the belt 84. Rotation of the belt 84 causes rotation of the pulley 50. Rotation of the pulley 50 imparts a force on the steering shaft 42, thereby assisting in causing rotational movement of the input shaft 18.

The control unit 90 monitors the speed of the motor 52 by measuring the rotational movement of the target disc 114. As the target disc 114 rotates with the input shaft 54, the sensor 112 generates a target disc signal based on the detection of the alternating north and south magnetic elements 18 passing thereby. The target disc signal is transmitted to the control unit 90, thereby providing feedback of the rotational movement of the steering shaft 42. Preferably, the sensor 112 is a Hall effect switch which can detect both speed and rotational direction of the target disc. To accomplish this, the sensor 112 can include a plurality of Hall effect sensors spaced at a predetermined distance with respect to the spacing of the elements 118 of the target disc 114. A plurality of sensors may also be used for the measurement.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A power assisted steering system comprising:
  a steering assembly including a steering shaft; and
  a power assist assembly including:
    a housing defining first and second portions;
    a motor having an output shaft that is connected to said steering assembly;
    a target disc connected to said output shaft for rotation therewith;
    a control unit having a printed circuit board and disposed in said first portion of said housing;
    at least one sensor supported on said printed circuit board and responsive to rotation of said target disc for generating a signal, said controller being responsive to said sensor signal for controlling the operation of said motor; and
    a torque sensor disposed in said second portion of said housing adjacent said printed circuit board, said torque sensor being connected to said control unit and generating a signal that is representative of the amount of a torque that is exerted on said steering shaft.

2. The system of claim 1, wherein said at least one sensor is a non-contact limit switch.

3. The system of claim 2, wherein said at least one sensor is a Hall effect sensor.

4. The system of claim 1, wherein said at least one sensor detects rotational speed of said target disc.

5. The system of claim 1, wherein said at least one sensor detects angular position of said target disc.

6. The system of claim 1, wherein said at least one sensor detects rotational direction of said target disc.

7. The system of claim 1, wherein said at least one sensor detects rotational speed and rotational direction of said target disc.

8. The system of claim 1, wherein said target disc includes a plurality of circumferentially spaced alternating magnetically charged elements.

9. The system of claim 1, wherein said target disc is press fit onto said output shaft.

10. The system of claim 1, wherein said motor is mounted in a first housing, and wherein said control unit is mounted in a second housing having an open end facing said motor, said target disc being mounted between said motor and said second housing.

11. The system of claim 1, wherein said printed circuit board has an opening formed therethrough for the passage of said output shaft.

12. The system of claim 11, wherein said target disc is positioned between said printed circuit board and said motor.

13. The system of claim 1, wherein said steering assembly includes a steering shaft, and wherein said power assist assembly further includes a gear assembly connected between said steering shaft and said output shaft for rotational gear reduction.

14. The system of claim 13, wherein said gear assembly is a direct gearing configuration.

15. The system of claim 13, wherein said gear assembly is a planetary gearing configuration.

16. The system of claim 13, wherein said gear assembly includes a belt rotationally connecting said gear assembly to said steering shaft.

17. The system of claim 13, wherein said steering shaft includes a pinion, and wherein said steering assembly further includes:

a steering assembly housing; and rack slidably disposed in said housing for connecting with steered wheels of a vehicle, said rack having teeth formed thereon for engagement with said pinion.

* * * * *